US006800141B2

(12) United States Patent
Sachdev et al.

(10) Patent No.: US 6,800,141 B2
(45) Date of Patent: Oct. 5, 2004

(54) SEMI-AQUEOUS SOLVENT BASED METHOD OF CLEANING ROSIN FLUX RESIDUE

(75) Inventors: Krishna G. Sachdev, Hopewell Junction, NY (US); Chon C. Lei, Poughkeepsie, NY (US); Demian M. Riccardi, Madison, WI (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 10/026,269

(22) Filed: Dec. 21, 2001

(65) Prior Publication Data

US 2003/0121529 A1 Jul. 3, 2003

(51) Int. Cl.⁷ ................................................ B08B 3/00
(52) U.S. Cl. .................... 134/26; 510/175; 134/19; 134/29; 134/30; 134/21; 438/906
(58) Field of Search ................ 134/19, 26, 30, 134/38, 40; 510/175

(56) References Cited

U.S. PATENT DOCUMENTS

| | | | |
|---|---|---|---|
| 3,401,126 A | 9/1968 | Miller et al. ................ 252/514 |
| 3,429,040 A | 2/1969 | Miller ......................... 29/626 |
| 4,276,186 A | 6/1981 | Bakos et al. ................ 252/158 |
| 4,934,391 A | * | 6/1990 | Futch et al. .................. 134/40 |
| 5,112,517 A | 5/1992 | Buchwald et al. .......... 252/171 |
| 5,218,979 A | * | 6/1993 | Sugita et al. .................. 134/2 |
| 5,340,407 A | 8/1994 | Bolden et al. ................ 134/26 |
| 5,431,739 A | 7/1995 | Bengston ....................... 134/2 |
| 5,486,314 A | * | 1/1996 | Wack et al. ................. 510/163 |
| 5,888,308 A | * | 3/1999 | Sachdev et al. ................ 134/1 |
| 5,938,856 A | 8/1999 | Sachdev et al. ............. 134/1.3 |
| 6,503,874 B2 | * | 1/2003 | Sachdev et al. ............ 510/177 |
| 6,569,252 B1 | * | 5/2003 | Sachdev et al. ................ 134/2 |
| 2001/0039251 A1 | * | 11/2001 | Sachdev et al. ............ 510/177 |
| 2002/0094940 A1 | * | 7/2002 | Sachdev et al. ............ 510/177 |
| 2003/0066540 A1 | * | 4/2003 | Sachdev et al. ................ 134/1 |

FOREIGN PATENT DOCUMENTS

JP       03004587       * 1/1991

* cited by examiner

*Primary Examiner*—Michael Kornakov
(74) *Attorney, Agent, or Firm*—James J. Cioffi

(57) ABSTRACT

A semi-aqueous solvent based method using non-aromatic, halogen-free organic solvent compositions for the effective removal of flux residue from electronic component surfaces after high temperature solder interconnections in the presence of rosin based flux compositions. Rosin flux residue can be removed using hydrophobic, essentially water insoluble, propylene glycol alkylether solvents in conjunction with a surfactant, preferably an ionic and/or a mixture of a non-ionic and an ionic surfactant in the first step, then a second step involving immersion with agitation in a hydrophobic solvent with no added surfactant. This is followed by a third step of hydrophilic solvent immersion with agitation/spray, rinsing off the hydrophilic solvent with water, and then a drying step.

20 Claims, 3 Drawing Sheets

Rosin Acids

Abietic Acid (I)

Dehydroabietic Acid (II)

Dihydroabietic Acid (III)

Tetrahydroabietic Acid (IV)

US 6,800,141 B2

SEMI-AQUEOUS SOLVENT BASED METHOD OF CLEANING ROSIN FLUX RESIDUE

FIELD OF THE INVENTION

The present invention relates generally to a method of removing flux residue formed on electronic assembly surfaces and interfaces during high temperature soldering operations using rosin based flux for semiconductor device interconnections in electronic module assemblies. More particularly, the invention relates to a semi-aqueous solvent based method employing high boiling point, halogen-free, and non-aromatic organic solvent based cleaning compositions, in conjunction with water rinse, for removing the flux residue formed on the electronic assembly surfaces during semiconductor device joining to ceramic or organic chip carriers.

BACKGROUND OF THE INVENTION

Electronic assembly processes in microelectronic fabrication typically employ solder interconnections using a lead-tin (Pb/Sn) alloy for electrically joining a semiconductor device to a chip carrier, such as a ceramic substrate or a printed circuit board (PCB). Recently there has also been a focus on Pb-free solder alloys. An example of solder interconnections is C4 (controlled-collapse-chip-connection) technology, also called flip-chip bonding, where a semiconductor chip is attached to a substrate. This involves connecting an array of solder bumps on the semiconductor chip to bonding pads on the substrate by heating the assembly to solder reflow temperature in the presence of rosin based flux to form a solder connection.

In multilayer ceramic (MLC) products, solder bumps on silicon devices are generally Pb/Sn alloys of various compositions which are deposited by evaporation or plate-up techniques. Alternatively, Pb-free solder alloys of the type Sn/Cu/Ag and Bi/Sn are being investigated by the industry to replace Pb based solder alloys.

Solder interconnection processes with high melting solder alloys typically utilize a rosin-based flux, for example Alpha 102-1500 rosin flux (Alpha Metals Flux 102-1500), which is applied on the array of semiconductor device solder bumps or on the solder wettable pads on the substrate. Due to its viscosity and tackiness the flux helps maintain the alignment of the solder bumps to the substrate bonding pads. The flux also provides an oxide-free native metal surface on the Pb/Sn solder bumps on the device side by complexing with the surface oxide layer and thereby exposing the native metal underneath for metal-to-metal contact with the bonding pads on the substrate side. This provides bond integrity and long term reliability of the solder connections.

After alignment, the semiconductor device/substrate assembly is subjected to solder reflow in a furnace under $N_2$ or forming gas (5% $H_2$ in $N_2$) using a temperature profile with a peak temperature depending on the solder type and composition. For example, with 97Pb/3Sn alloy, a temperature profile with a peak temperature of approximately 350 to 365° C. is used. The processes for flip-chip attachment to a multilayer ceramic chip carrier using solder bumps is disclosed in U.S. Pat. Nos. 3,401,126 and 3,429,040 (Miller et al.), the disclosures of which are incorporated by reference herein.

Rosin flux is also used for solder connections in the fabrication of ball grid array (BGA), ceramic ball grid array (CBGA), ceramic column grid array (CCGA), Surface Mount Technology (SMT) discretes, and hermetic seal band attachment to provide surface wettability of contacting surfaces during solder reflow.

The high temperature solder reflow conditions cause the rosin flux constituents to undergo a thermal transformation generating low molecular weight species which vaporize and are mostly removed in the process. However some of the reactive species, especially the higher molecular weight species, remain on the various surfaces. During the cooling cycle, after the solder reflow, the solder hardens forming solder connections between the semiconductor device and the substrate bonding pads. At the same time the thermally activated residual species from the flux decomposition undergoes cross-linking reactions which result in a resinous/carbonaceous by-product known as flux residue. This flux residue forms on the solder connections and on all other surfaces, including under the chip, on the semiconductor device and substrate that are exposed to the volatile species during solder reflow processing.

This cross-linked flux residue must be removed before subsequent operations can be performed. Failure to clean the flux residue can lead to reliability problems in long term use due to the possibility of stress corrosion when the assembly is exposed to a temperature and humidity environment. It is desirable to remove the flux residue prior to applying and curing an underfill material if such a material is used to encapsulate the solder connections for fatigue life enhancement and protection from the detrimental effect of environmental exposure. Failure to clean the flux residue can lead to voids in underfill coverage and adhesion failure resulting in device function reliability problems.

Rosin flux materials which are derived from the various Pine species are natural products comprising a complex mixture of cyclic hydrocarbon acids which constitute almost 90 percent of the rosin flux chemical composition along with a small fraction of polymerized rosin and about 10 percent of a neutral fraction constituting the corresponding esters, alcohols, acetate, and decarboxylated products. Referring to FIG. 1 there is illustrated rosin acid structures I–IV, which are the major components of the rosin flux. Abietic acid (I) is the predominant component along with dehydroabietic acid (II), dihydroabietic acid (III), and tetrahydroabietic acid (IV). The rosin flux is known to promote wetting of metal surfaces due to the complexation reaction of the rosin acids in the flux with the oxide layer on the solder surface. The rosin flux also provides an oxide-free exposed metal surface of high surface energy which thermodynamically should readily wet the contacting metal surfaces on the substrate and thereby provide reliable chip-to-substrate interconnection.

Commonly employed methods of cleaning the rosin flux residue left after high temperature solder reflow in the process of device to substrate interconnection involves the use of chlorinated solvents such as tetrachloroethylene and aromatic hydrocarbons such as xylene. More recently solvent compositions for flux residue cleaning consisting of trans-1,2-dichloroethylene (1,2-DCE), fluorochlorocarbons, hydrofluorocarbons (HFC) blends containing 1,2-DCE as the major component, hydrofluoroethers (HFEs), or mixture thereof, have become available as a replacement of tetrachloethylene in flux residue cleaning. These halogenated solvents, however, are undesirable due to associated environmental and disposal issues. This limits their desirability for use in industrial applications.

The use of xylene as a flux residue cleaning solvent also has concerns since it is a highly flammable volatile organic compound (VOC) with a flash point of about 85° F., a boiling point of approximately 135–145° C., a high vapor pressure, and a high evaporation rate. The use of xylene requires high cost explosion proof equipment and chemical safety measures in the manufacturing environment as well as regulatory compliance for air emissions in the case of VOC's and hazardous air pollutants (HAPS).

There are a number of solutions proposed by others which provide alternate organic solvents that are relatively safe and mostly exempt from strict environmental regulations, as well as water-based cleaning solutions and the necessary equipment for alternate organic solvent and water-based cleaning.

Bolden et al., U.S. Pat. No. 5,340,407, the disclosure of which is incorporated by reference herein, describes a process of removing soldering flux and/or adhesive tape residue from a substrate. Bolden uses terpene-based cleaning compositions for flux residue removal from the surface of a printed circuit board, and also for the removal of the adhesive tape residue.

Bakos et al., U.S. Pat. No. 4,274,186, the disclosure of which is incorporated by reference herein, describes a cleaning composition containing N-methyl-2-pyrrolidone and an alkanolamine for flux residue cleaning from the surface of printed circuit boards.

Bengston et al., U.S. Pat. No. 5,431,739, the disclosure of which is incorporated by reference herein, describes environmentally safe flux removing compositions using aryl alcohols such as benzyl alcohol in water as a cleaning medium for solder flux residue from mildly activated rosin flux (RMA), oils and other contaminants from the surface of printed circuit boards.

Buchwald et al., U.S. Pat. No. 5,112,517, the disclosure of which is incorporated by reference herein, is concerned with using halogenated hydrocarbons, such as dichlorodifluoroethanes in conjunction with alkanols for removing rosin flux and flux residues from printed circuit boards.

None of the references listed above are concerned with removal of rosin flux residue formed on under-the-chip surfaces when rosin flux such as Alpha 120-1500 is used for high temperature solder interconnections. This process requires high temperature solder reflow at peak temperature above 300° C. Examples of this high temperature solder reflow process include BGA, CBGA, and CCGA module assemblies. Accordingly, there exists a need for an alternative method of removing flux residue which is free from the problems associated with the traditionally used solvents referenced above.

Sachdev et al., U.S. Pat. No. 5,938,856, the disclosure of which is incorporated by reference herein, describes flux residue cleaning solvent compositions and a process for removing flux residue from under-the-chip where solder compositions used for device chip joining to ceramic substrate required peak solder reflow temperature from 320° C. to about 365° C. in the presence of high temperature rosin Alpha-102 flux. The solvent compositions described employ environmentally friendly non-halogenated and non-aromatic solvents for the residue cleaning cycle and isopropanol (IPA) or other low boiling solvents for the follow-on rinse cycle. Although this method is an improvement over the existing methods, the cleaning solvent compositions and the rinse solvents have a relatively low boiling point and flash point, a high evaporation rate and high vapor pressure which requires the use of costly safety equipment in a manufacturing environment.

Notwithstanding the prior art there remains a need for an improved method for the effective removal of flux residue from electronic components after solder interconnections, particularly under the device flux residue, formed during high temperature solder reflow conditions in the presence of rosin based flux compositions.

Accordingly, it is a purpose of the present invention to provide an improved method for the effective removal of flux residue from electronic components after solder reflow using high temperature solder alloys in the presence of rosin based flux compositions that is based on the use of environmentally friendly solvents with no chemical safety issues.

It is another purpose of the present invention to provide a non-hazardous semi-aqueous solvent based method of removing flux residues formed during solder reflow on the surfaces and under-the-chip in electronic component assembly fabrication processes.

It is another purpose of the present invention to provide an environmentally friendly method of cleaning flux residue that accumulates on the device chip and the chip carrier surface/interface regions during C4 interconnections or flip-chip bonding processes involving a high temperature solder reflow thermal profile.

It is another purpose of the present invention to provide an alternate method of cleaning flux residue which effectively eliminates the need for chlorinated and/or fluorinated solvents, and aromatic hydrocarbon solvents such as xylene.

It is another purpose of the present invention to provide an environmentally safe method of cleaning rosin flux residue from electronic assembly surfaces following solder joining process using evaporated or plated Pb/Sn solder, lead-free solder alloys, for example, Sn/Cu/Ag, Sn/Ag, Sn/Bi, or soft solder paste made with 80Au/20Sn alloy.

It is another purpose of the present invention to provide an improved method of cleaning post-chip join flux residue using a solvent cleaning composition constituting a high boiling hydrophobic solvent and an ionic and/or non-ionic surfactant, followed by water rinse to remove the cleaning solvent from the various exposed surfaces of the assembled electronic module.

It is another object of the present invention to provide an alternate method of cleaning flux residue employing organic solvents which have no major environmental regulatory health issues, no chemical safety concerns, and which have high boiling point and high flash point, low evaporation rate, and low vapor pressure.

These and other purposes of the present invention will become more apparent after referring to the following description considered in conjunction with the accompanying drawings.

BRIEF SUMMARY OF THE INVENTION

The purposes and advantages of the present invention have been achieved by providing a method for removing rosin flux residue from assembly surfaces, interfaces and under device surfaces which comprise the steps of:

(a) providing a first cleaning composition which comprises a first water insoluble hydrophobic solvent with a surface active agent;

(b) immersing the assembly in the first cleaning composition and soaking the assembly in the first cleaning composition for 10 to 20 minutes at 50 to 90° C. with intermittent agitation;

(c) removing the assembly from the first cleaning composition;

(d) immersing the assembly in a second cleaning composition which comprises a second water insoluble hydrophobic solvent and soaking the assembly in the second cleaning composition for 10 to 20 minutes at 50 to 90° C. with agitation, preferably an immersion spray;

(e) removing the assembly from the second cleaning composition;

(f) applying a third cleaning composition which comprises a hydrophilic water soluble solvent, typically a propylene glycol methyl ether solvent, preferably applied by immersion with pressure spray, at approximately 50 to 75° C. to the assembly for about 5 to 10 minutes;

(g) applying a water rinse, preferably a deionized water rinse, at approximately room temperature to 65° C. to the assembly for approximately 5 to 10 minutes;

(h) blowing gas on the assembly and then heating the assembly to approximately 80 to 120° C. to dry the assembly and thereby complete the removal of the flux residue from the assembly surfaces, interfaces and from under the device surfaces. The heating step at elevated temperature is preferably performed under vacuum.

The first water insoluble hydrophobic solvent and the second water insoluble hydrophobic solvent are propylene glycol alkylethers represented by the formula RO—$(C_3H_6O)_N$—$C_3H_6OH$ wherein R is selected from the group consisting of propyl, butyl, pentyl and isobutyl and where N=0 to 4, and preferably 1 to 3. The surface active agent is an ionic surfactant or a combination of ionic and non-ionic surfactants.

The ionic surfactant or combination of ionic and non-ionic surfactants are preferably about 5 to 25 weight % of the first water insoluble hydrophobic solvent. The ionic surfactants are predominantly abietic acids selected from the group consisting of abietic acid, dihydrabietic acid, tetrahydroabietic acid, dehydroabietic acid, and mixtures thereof. Preferably Alpha 102-1500 rosin flux in benzyl alcohol. For example, approximately 60–70% (weight %) rosin flux and approximately 30–40% (weight %) benzyl alcohol. The second water insoluble hydrophobic solvent is preferably the same composition as the first water insoluble hydrophobic solvent.

The non-ionic surfactant is selected from the group consisting of rosin acid ester derivatives, abietyl alcohol, dihydroabietyl alcohol and mixtures thereof The non-ionic surfactant may also be an alkyl polyglycoside based surfactant, ethoxylated propoxylated aliphatic alcohol, or mixture thereof, preferably a low foam surfactant blend, Glucopon LF-1 (Cognis Corp., previously Henkel Corp.).

The hydrophilic water soluble propylene glycol methyl ether solvent is represented by the formula CH3O—$(C_3H_6O)_N$—$C_3H_6OH$ where N=0 to 4, and preferably 1 to 3.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, however, both as to organization and method of operation, may best be understood by reference to the detailed description which follows taken in conjunction with the accompanying drawings in which:

DETAILED DESCRIPTION OF THE INVENTION

This invention relates generally to bond and assembly processes in microelectronics fabrication, particularly to the attachment of semiconductor devices to chip carriers involving solder connections using evaporated or plated Pb/Sn solder alloys or Pb-free alloys such as Sn/Ag/Cu, Sn/Ag, Sn/Bi, and Au/Sn, in the presence of rosin flux. The term "chip carrier" is a generic term for any device support platform including ceramic substrates, organic substrates and printed circuit boards. Examples include flip-chip joining processes in the fabrication of multi-chip-modules (MCM) and single-chip-modules (SCM), and for device-substrate package interconnections to an organic board or a printed circuit board (PCB), and to attach other electronic components to a PCB.

The invention particularly relates to a method of removing flux residues that are formed on the electronic assembly surfaces, interfaces, and under the devices during high temperature soldering operations using rosin based flux. The method uses a semi-aqueous solvent based cleaning composition for removing flux residue that is formed on the chip and the substrate interface regions and/or on the organic board or card in the process of C4 or flip-chip bonding, using a high boiling point, halogen-free, non-aromatic organic solvent based cleaning composition to remove flux residue from various exposed surfaces, especially the under-the-chip surface/interface regions of the device chip and the chip carrier, and using water for the rinse.

Figure 1:
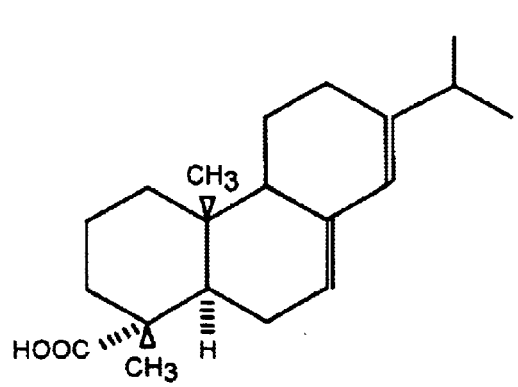
FIG. 1 is an illustration of rosin acid structures which are the major components of the rosin flux according to the prior art.
Figure 1:
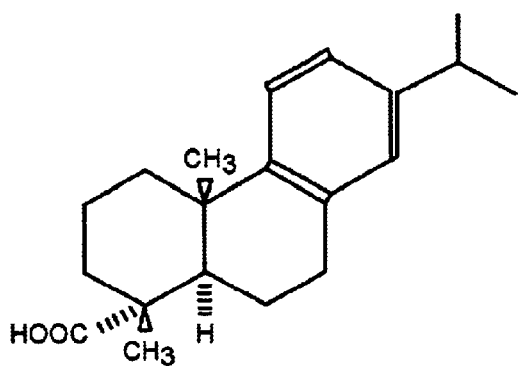
Figure 1:
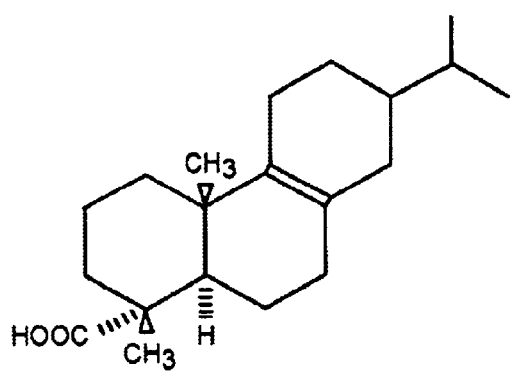
Figure 1:
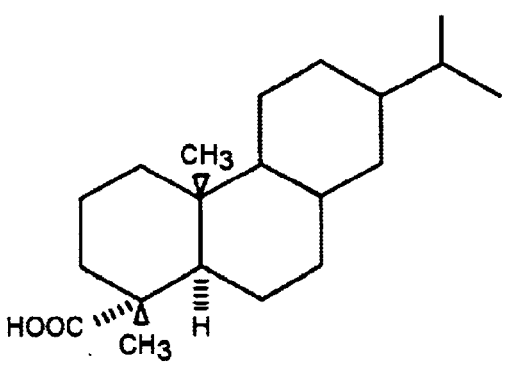
Figure 2:
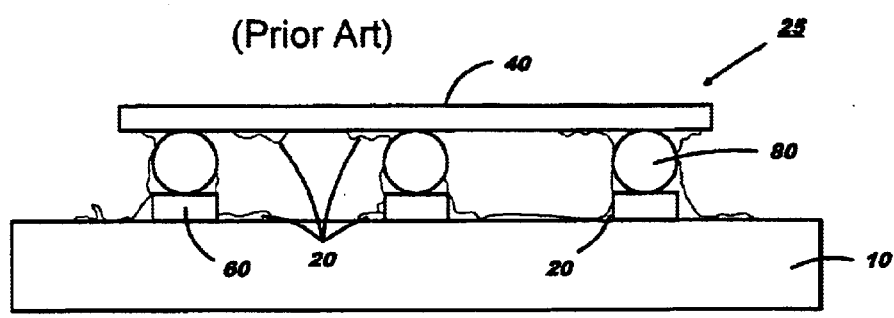
FIG. 2 is a cross-sectional view of a semiconductor device that has been joined according to the prior art which shows the residual flux residue on the surfaces and under the device.

Referring to FIG. 2 there is shown an illustration of an interconnection structure 25, where an integrated semiconductor device or chip 40, has been joined to a chip carrier or substrate 10, using at least one solder ball 80, on at least one pad 60. FIG. 2 also shows a flux residue 20, on the underside of a chip 40, on the solder ball connections 80, on the surface of the ceramic substrate 10, and on the side walls of the bond pads 60, that is present after conventional cleaning. This flux residue 20 must be removed for a variety of reasons, for example, to pass quality inspections, to avoid shorts, and to prevent entrapment of other undesirable materials.

Figure 3:
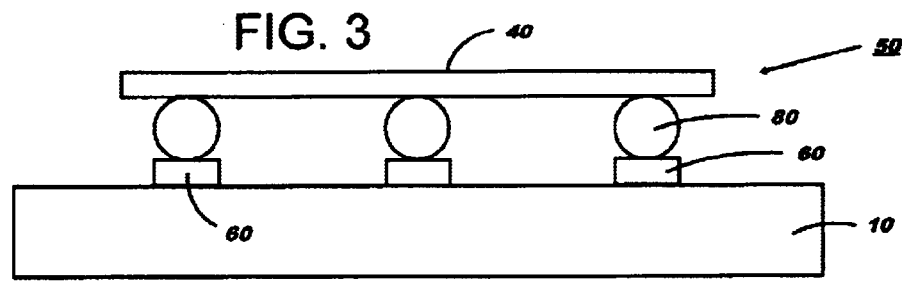
FIG. 3 is a cross-sectional view of the semiconductor device of FIG. 2, after the removal of the flux residue using the cleaning method according to the present invention.

Referring to FIG. 3 there is shown an interconnection structure 50, which is similar to the interconnection structure 25, except that the flux residue 20, as shown in FIG. 2, has been removed using the semi-aqueous solvent cleaning method according to the present invention, and that the interconnection structure 50 is now ready for further processing. It is illustrated in FIG. 3 that there is no residual flux residue 20 on the underside of the chip 40, or on the solder ball connection 80, or on the surface of the ceramic substrate 10, or on the side walls of the bond pads 60.

Figure 4:
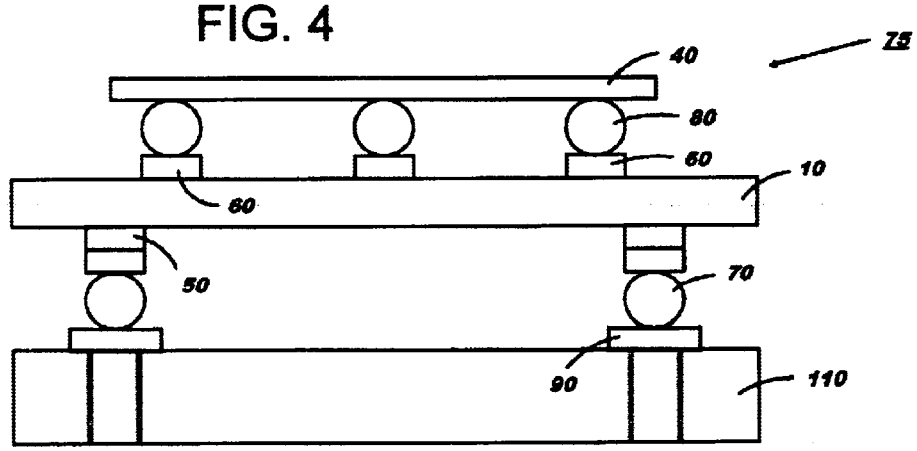
FIG. 4 illustrates a plurality of semiconductor devices that have been joined and the residual flux residue removed using the cleaning method according to the present invention.

Referring to FIG. 4 there is shown the interconnection structure 75 that is comprised of a flip-chip 40, that is electrically joined to the ceramic substrate 10, using at least one solder bump connection 80, and the substrate bonding pads 60. The substrate 10 is then joined to a card, such as an organic card 110, through at least one solder ball connection 70, and substrate bond pads 50, to the bond pads 90, on the card 110. The flux residue 20, that is formed after the soldering process, is shown to have been removed from all the surfaces by the semi-aqueous solvent cleaning method according to the present invention.

Figure 5:
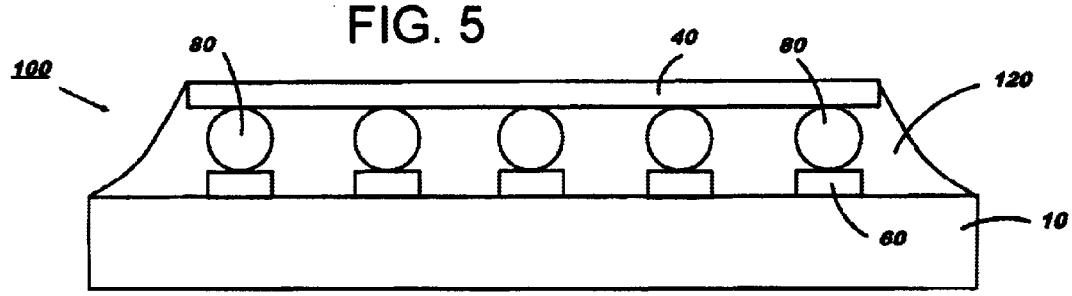
FIG. 5 is a cross-sectional view of the semiconductor device of FIG. 2, after the flux residue cleaning according to the present invention.

Referring to FIG. 5 there is shown a cross-sectional view of an interconnection structure 100, comprising the semiconductor device 50 of FIG. 3, after the flux residue areas have been cleaned according to this invention and the flux residue-free solder connections in the assembly have been protected using at least one protective material 120. An example of a protective material 120 is an epoxy and/or cyanate ester resin encapsulant.

The semi-aqueous solvent based method of cleaning rosin flux residue generated in the process of solder connections for device joining to a substrate, according to this invention, employs environmentally friendly organic solvent compositions to replace the commonly used flux residue cleaning solvents such as the aromatic hydrocarbons. Typical aromatic hydrocarbons are xylene and chlorinated solvents such as tetrachloroethylene. These solvents have been classified as hazardous air pollutants (HAPs). Xylene has additional safety concerns in that it is a highly flammable volatile organic compound (VOC). It has a flash point of about 85° F., a boiling point between 135–145° C., a high vapor pressure, and a high evaporation rate which requires high cost chemical safety control measures in a manufacturing environment as well as regulatory compliance for air emissions of volatile organic compounds and hazardous air pollutants.

In the fabrication of microelectronics devices, forming solder interconnections is an integral part of the electronic assembly process. Typical examples include attachment of a semiconductor device chip to a substrate, solder ball and solder column attachment to back side metal (BSM) pads on the substrate, and a protective cap attachment to the assembled electronic module. Bonding techniques that employ solder bumps on the semiconductor devices use a lead-tin (Pb/Sn) alloy, and more recently Pb-free solder alloys, for electrically joining a semiconductor device to a chip carrier. A flux, typically Alpha 102-1500 rosin flux, is applied on the solder bumps and/or the solder wettable metal pads on the chip carrier.

After alignment the assembly is subjected to a solder reflow thermal profile typically in an oxygen-free ambient of $N_2$ or forming gas (5% $H_2$+95% $N_2$). The peak temperature used in the solder reflow temperature excursion depends on the Pb/Sn alloy composition used. Various Pb/Sn alloy compositions include 97/3, 95/5, 90/10 or eutectic Pb/Sn composition which are deposited by evaporation or plate-up techniques. Alternatively, Pb-free solders of the type Sn/Ag/Cu, Sn/Ag, Sn/Bi, Au/Sn are also being investigated by the industry to replace Pb based solder connections. Regardless of the solder type used, the device join process involves applying a high temperature flux, typically Alpha 102-500 rosin flux. The rosin flux is applied on the device solder bumps and/or on the solder wettable pads on the chip carrier where the rosin flux promotes wetting of the metal and provides an oxide-free native metal surface by complexing with the surface oxide layer on the Pb/Sn solder bumps and exposing the native metal surface. This provides the necessary metal-to-metal contact for bond reliability.

The flux itself undergoes a thermally induced chemical change that leads to the formation of a volatile species which is mostly removed during the process. However some of the thermally activated species from the flux constituents, particularly those having higher molecular weight, remain on the various exposed surfaces and undergo secondary cross-linking reactions during the cooling cycle. This results in the deposition of a carbonaceous flux residue on the assembly surfaces, interfaces and under the devices. It is necessary that this flux residue be removed prior to subsequent operations because of its possible detrimental effect on the functional performance and long term reliability of the product due to metal corrosion under temperature-humidity environments, and problems with underfill or C4 encapsulant adhesion in electronic modules where underfill is required.

This invention provides a semi-aqueous solvent-based method of removing flux residues that are formed on the electronic assembly surfaces, interfaces and under the devices in the high temperature soldering operations using rosin based flux. More particularly, the disclosed method removes flux residue from under-the-device, on the device, and from the chip carrier interface regions and/or on the card in the process of C4 or flip-chip bonding, using a high boiling, halogen-free, non-aromatic organic solvent to remove flux residue and using water for the rinse.

The semi-aqueous solvent based method of cleaning rosin flux residue according to the present invention employs environmentally friendly organic solvent compositions selected from the group consisting of propylene glycol alkylethers. They are found to effectively replace the commonly used flux residue cleaning solvents such as aromatic hydrocarbons, typically xylene and chlorinated solvents such as tetrachloroethylene, trans-1,2-dichloroethylene and related solvents.

The semi-aqueous solvent-based method of cleaning flux residue involves a sequence of process steps. In the first step the assembly to be cleaned is immersed in a mixture of a hydrophobic, essentially water insoluble, propylene glycol alkylether solvent in conjunction with about 5% to about 25% (weight %) of an ionic surfactant or a combination of ionic and non-ionic surfactants. For example, an alpha 102-1500 flux composition containing 60% rosin component in about 40% benzyl alcohol (weight %), or rosin flux constituents which are predominantly abietic acid and its derivatives, and other abietates. The assembly is immersed in the solvent-surfactant mixture for approximately 10 to 20 minutes at approximately 50 to 90° C. with intermittent agitation.

In the second step the assembly is subsequently immersed with agitation in a hydrophobic, essentially water insoluble, propylene glycol alkylether solvent, preferably the same solvent as in the first step but without the added surfactant. The assembly is immersed for approximately 5 to 20 minutes at approximately 50 to 90° C. using immersion spray or other means of agitation.

In the third step the assembly is immersed or sprayed in a hydrophilic, essentially water soluble, propylene glycol methyl ether solvent at approximately 50 to 75° C. for approximately 5 to 10 minutes by pressure spray or immersion with agitation to replace the carried over hydrophobic solvent from the second step.

In the fourth step the assembly is subjected to a water rinse, preferably a pressure spray rinse with deionized water to remove the hydrophilic solvent. The water rinse is for approximately 5 to 10 minutes at room temperature to approximately 65° C. The assembly is then dried by blowing air or nitrogen on the assembly and then heating at an elevated temperature, approximately 80 to 120° C.

Examples of hydrophobic, essentially water insoluble or partially water soluble, propylene glycol alkylether solvents include: monobutyl ethers of propylene glycol, dipropylene glycol, tripropylene glycol, and mixtures thereof, or tripropyleneglycol dialkyl ethers. Examples of hydrophilic water soluble solvents used in the third step of the cleaning process according to this invention include: monomethyl or monoethyl ether of dipropyleneglycol or tripropyleneglycol, or a combination thereof.

The ionic surfactant used in combination with the hydrophobic propyleneglycol alkylether solvent in the first step can be Rosin flux itself, specifically the 60/40 composition mentioned above, Alpha 102-1500 rosin flux in benzyl alcohol, or its individual constituents, for example, abietic acid, or other abietates. The non-ionic surfactant can be abietyl alcohol, dihydroabietyl alcohol (Abitol), and ester derivatives of cyclohydrocarbon acids, and related derivatives.

These solvent cleaning compositions, and the method of cleaning disclosed here, have been found highly effective in removing flux residues. Examples of such flux residues include Alpha 102-1500 rosin flux residue formed during chip attachment to a substrate using Pb/Sn solder alloys such as the evaporated or plated Pb/Sn alloy, or Pb-free solder alloys as Sn/Ag/Cu, Sn/Ag, Sn/Bi, Au/Sn alloy, in the presence of fluxing agents as the high temperature rosin flux.

The semi-aqueous solvent-based method of cleaning flux residue is now described in more detail. In the first step, a mixture of an essentially water insoluble or partially water soluble hydrophobic solvent is selected from the group consisting of propylene glycol alkylethers represented by the formula: RO—$(C_3H_6O)_N$—$C_3H_6OH$, where R=propyl, butyl, pentyl, isobutyl group and N=0 to 4, preferably 1 to 3; and about 5–25% (weight %) of an ionic surfactant or a combination of an ionic and a non-ionic surfactant. For example, an ionic surfactant can be a combination of cyclic hydrocarbon acids including the Alpha 102-1500 rosin flux and/or its individual constituents, abietic acid, dihydrabietic acid, tetrahydroabietic acid, dehydroabietic acid, and mixtures thereof.

Examples of the non-ionic surfactants for the purpose of this invention include abietyl alcohol, dihydroabietyl alcohol (Abitol), and other related abietates such as the ester derivatives of the rosin acids. Other examples of non-ionic surfactants which can be used include the alkyl polyglycosides, ethoxylated propoxylated aliphatic alcohols, or mixtures thereof, for example a low foam surfactant blend, Glucopon LF-1 (Cognis Corp., previously Henkel Corp.).

In the second step, an essentially water insoluble hydrophobic solvent, preferably the same solvent as used in the first step, but without adding a surface active agent, is used. In the third step, an essentially water soluble hydrophilic solvent selected from the group consisting of propyleneglycol methyl ethers represented by the formula: $CH_3O$—$(C_3H_6O)_N$—$C_3H_6OH$, where N=0 to 4, preferably 1 to 3, is used.

The purpose of the immersion or soak time in the first step is to cause softening and/or swelling and removal of the flux residue deposit. The soak time is preferably in the range of about 10 minutes to about 20 minutes depending on the process variables, such as the temperature and the agitation method for the cleaning composition, and also on the chemistry and thickness of the residue generated in the solder reflow joining operation.

In the second step, using neat hydrophobic solvent without added surfactant, preferably the same solvent as used in the first step, the residual effected flux residue is essentially removed along with the surfactant component by solvent immersion with pressure spray or other means of agitation at about 50–90° C. for about 5–20 minutes, again depending on the chemistry and the thickness of residue.

In the third step, using essentially a water soluble hydrophilic solvent, the hydrophobic solvent carry-over on the assembly surfaces from the second step is removed and replaced by the hydrophilic solvent using pressure spray or immersion with pressure spray or other means of agitation. In the fourth step, the hydrophilic solvent is removed from the electronic assembly surfaces by water rinse, preferably using deionized water followed by drying with air or $N_2$. The adsorbed water on the various surfaces after the rinse cycle is desorbed by heating the assembly at elevated temperature under $N_2$ atmosphere.

The effectiveness of the semi-aqueous method of removing under-the-chip flux residue generated in the high temperature solder reflow thermal profile for solder interconnections according to C4 or flip-chip technology, was demonstrated by several residue detection and quantification techniques. Characterization of the various surfaces after flux residue removal using the semi-aqueous solvent cleaning method described here showed no residual fluorescence at the peripheral regions of the attached chip after these regions had shown strong fluorescence under ultra violet exposure prior to subjecting the assembly to the flux residue cleaning process. The absence of fluorescence under the chip and on the corresponding substrate side was confirmed by chip detachment and observing the exposed surfaces under ultra violet light. Complete removal of carbonaceous flux residue on all surfaces was indicated by the absence of fluorescence since the flux residue itself shows strong fluorescence under ultraviolet radiation exposure.

Surface analysis by x-ray photoelectron spectroscopy (XPS) of the device chip and the substrate interface regions exposed by chip detachment following the residue cleaning process was used to determine the cleaning effectiveness and the compatibility of the process chemicals with the polyimide passivation material and the Pb/Sn solder by comparing the surface elemental composition of the various contacting chip and substrate surfaces before and after the cleaning operation. Further information on the presence of any traces of flux residue remaining under the chip after the semi-aqueous solvent cleaning was obtained by solvent extraction of the assembled module with a mixture of solvents having a wide range of polarity and solubility parameters and measuring ultraviolet absorption of the extract. The results showed the absence of significant ultraviolet absorption attributable to the rosin flux residue. Effective removal of the residue was also indicated by the absence of voids in the sonoscans or CSAM (computerized scanning acoustic microscopy) images after the underfill or under-the-chip C4 encapsulant dispense and curing. This confirmed complete removal of residue.

The preferred solvent candidates according to this invention are classified as combustible solvents in Class II and Class III combustibles. They have flash points greater than 140° F. and are not among the flammable category of solvents. Representative solvent candidates having these characteristic flash points are: propylene glycol butyl ether (138° F./58° C.), di(propylene glycol) butyl ether (DPBE) (205° F./96° C.), tri(propylene glycol) butyl ether (TPBE) (>230° F./110° C.), di(propylene glycol) methyl ether (DPM) (166° F./74° C.), tri(propylene glycol) monomethyl ether (TPM) (>230° F./110° C.), and having surface tension in the range 27–33 dynes/cm.

In representative simulation experiments for evaluating the effectiveness of the semi-aqueous cleaning method in removing flux residue from various surfaces of the electronic assembly, Alpha 102-1500 rosin flux was dispensed as a thin layer of about 1 mil (0.001 inch) to 3 mil (0.003 inch) thickness onto the ceramic substrate BSM having Mo/Ni/Au I/O (Input/Output) pads with Au being the top surface of the metal stack. The rosin flux was also dispensed on a plated 97Pb/3Sn surface, and on PMDA-ODA polyimide (cured product of pyromellitic dianhydride-oxydianiline derived polyamic acid) which is a commonly used polymer insulator for terminal via passivation on the device chip circuit side. The fluxed parts were subjected to the solder reflow furnace profile up to about 345–365° C. peak temperature and cooled to at least 200° C. before removal from the furnace.

Examination of the various surfaces under ultraviolet light showed strong fluorescence in the region where flux had been applied which is characteristic of the rosin flux residue formed after the high temperature solder reflow in the chip join process. For reference purposes, surface analysis of a sample part carrying flux residue on the surface was performed using photoelectron spectroscopy (XPS) which showed surface elemental composition corresponding to about 89–91% carbon and about 9–11% oxygen based on the relative intensity of the C (1s) and O (1s) signals.

Figure 6:
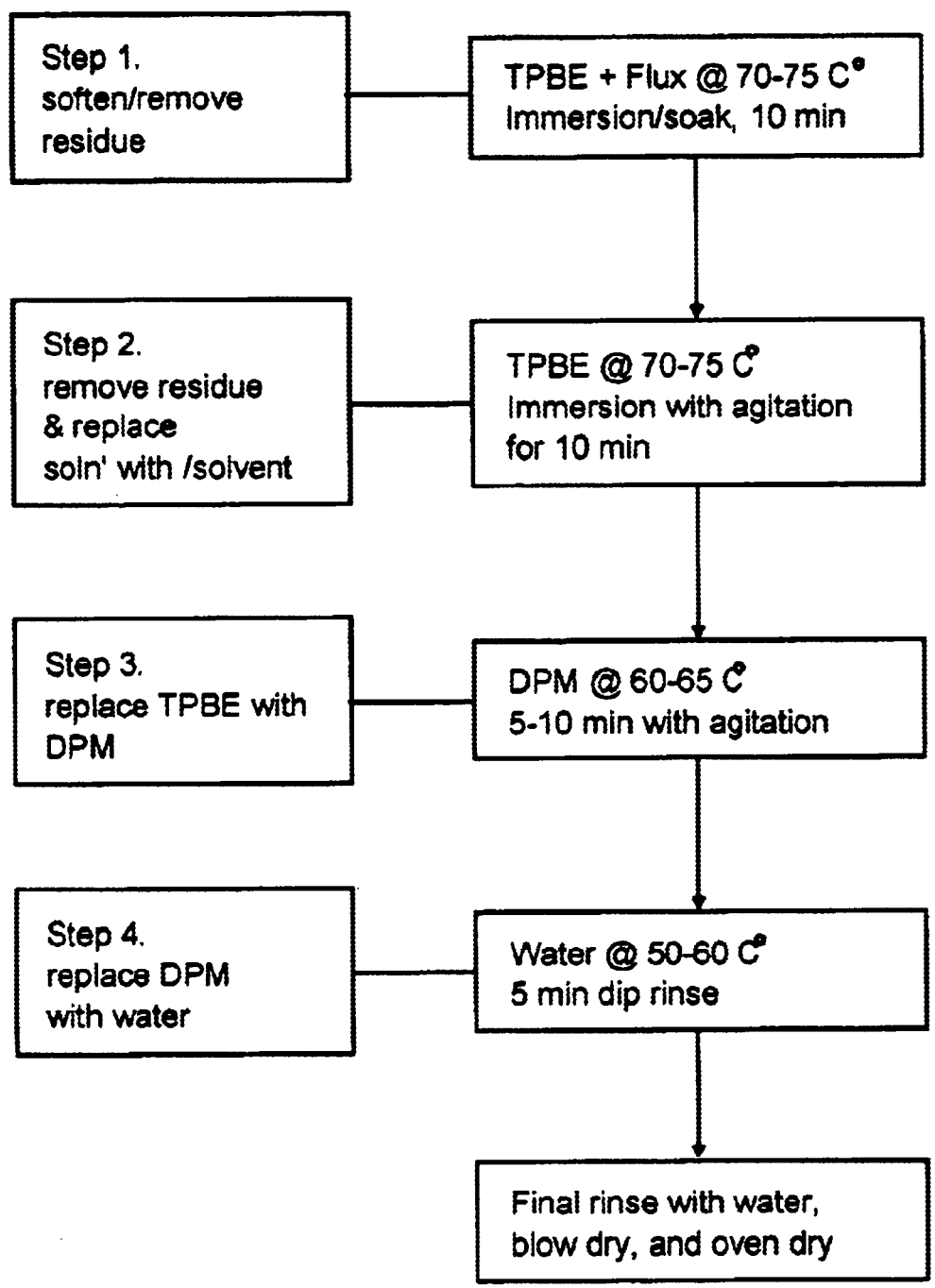
FIG. 6 is a flow chart of a representative experiment performed using the cleaning method according to the present invention.

Referring to FIG. 6, the various flux residue carrying substrates were subjected to the semi-aqueous solvent cleaning method described according to this invention using the following representative sequence of step and experimental conditions:

1. Immersion (or soak) of the substrate in a 90/10 (weight %) mixture of tri(propylene glycol) butyl ether (TPBE)

and Alpha 102-1500 rosin flux containing 40–50% rosin and 10–20% polymerized rosin in 30–40% benzyl alcohol (all in weight %), for 10 minutes at 70–75° C. with intermittent agitation.
2. Transporting the above treated substrate into a second tank having pre-heated TPBE only at about 70–75° C. and subjecting the substrate to immersion with agitation for 10 minutes.
3. Transporting the substrate after step 2, into a third tank having di(propylene glycol) methyl ether pre-heated to 60–65° C. and subjecting the substrate to immersion with agitation for 5–10 minutes.
4. Rinsing the substrate with water, preferably using pressure spray, to remove any solvent carry-over on the substrate and also to remove any particulate that might be present on the surface. The substrate is air dried and then oven dried, preferably under vacuum, at 80–120° C.

To determine the compatibility of the various contacting surfaces with the semi-aqueous solvent cleaning method for flux residue removal according to this invention, all relevant materials, particularly, ceramic substrates with Au bonding pads, plated Pb/Sn solder bumps, and a fully cured polyimide coating that is commonly used for device chip terminal via passivation, were subjected to the flux residue cleaning conditions described in steps 1 through 4, and analyzed by XPS (x-ray photoelectron spectroscopy) in comparison to the original surfaces.

In addition, representative simulation experiments for the flux residue cleaning on various relevant surfaces were performed. Alpha 102-1500 rosin flux was applied onto a ceramic substrate with I/O pads having Mo/Ni/Au with Au as the top surface, onto plated 97Pb/3Sn, and onto PMDA-ODA polyimide (cured product of pyromellitic dianhydride-oxydianiline derived polyamic acid). The polyimide coating is commonly used for the terminal via passivation on the device chips. The fluxed parts were subjected to chip join simulation using a standard high temperature solder reflow furnace profile and then cooled to at least 200° C. before removal from the furnace. The parts carrying rosin flux residue on the surface were subjected to the residue removal process according to this invention (steps 1 through 4 given above).

Characterization of the various surfaces after cleaning was carried out by XPS analysis and surface examination under ultraviolet light. There was no significant fluorescence which is indicative of the absence of rosin flux residue. The surface elemental composition, according to XPS analysis, was consistent with the removal of flux residue. The surfaces subjected to the flux residue cleaning process showed no change in the surface chemistry of the representative contacting surfaces including the polyimide passivation layer on the device chip circuit side. This demonstrates the compatibility of the semi-aqueous solvent process with the various device chip and the chip carrier materials. Representative surface elemental composition data from XPS analysis are provided in Table 1.

TABLE 1

| | | Surface Characterization by XPS Analysis Elemental Composition, Atomic % | | | | |
|---|---|---|---|---|---|---|
| Surface before cleaning | Cleaning chemistry | $C(1s)$ experiment (theory) | $O(1s)$ experiment (theory) | $N(1s)$ experiment (theory) | $Pb(4f7)$ experiment (theory) | $Sn(3d)$ experiment (theory) |
| Flux residue reference | none | 89,91 (N/A) | 11,9 (N/A) | — | — | — |
| Polyimide reference | none | 78.3 (75.9) | 15.9 (17.2) | 5.9 (6.8) | — | — |
| Polyimide/ flux residue | TPBE/flux Ex. 1 to 3 in table 2 | 78.2 (75.9) | 15.9 (17.2) | 5.9 (6.8) | — | — |
| 97/3 Pb/Sn reference | none | 43.8 (N/A) | 41.2 (N/A) | — | 11.8 (N/A) | 3.2 (N/A) |
| Plated 97/3 Pb/Sn solder | TPBE/flux Ex. 1 to 3 In table 1 | 51.8 (N/A) | 32 (N/A) | — | 5.5 (N/A) | 10.7 (N/A) |

This data shows that the flux residue reference surface (row 1) is primarily the carbonaceous residue from the rosin flux in the high temperature chip join process, containing about 89–91% carbon with about 9–11% oxygen. In the case of the polyimide surface, before subjecting it to the semi-aqueous solvent cleaning process (row 2), and after subjecting it to the semi-aqueous solvent cleaning process (row 3), the surface elemental composition remains essentially the same indicating the compatibility of the process with the polyimide chemistry. Comparing rows 4 and 5 the data further shows that in the case of a plated lead-tin surface there are small changes in the surface elemental composition after the cleaning cycle. The data shows an increase in the Sn (3d) signal and a decrease in the Pb (4f7) signal in comparison to the as-received sample. Such changes in the Pb/Sn surface composition are not unexpected due to the phase mobility of the alloy in the surface and sub-surface regions in response to thermal processing conditions. Microscopic examination of the Pb/Sn solder balls before and after the cleaning cycle showed no change in the integrity of the solder balls.

REPRESENTATIVE EXAMPLES

A device chip-ceramic substrate assembly was fabricated according to the standard chip join process to determine the effectiveness of the semi-aqueous solvent cleaning method for flux residue removal under-the-chip. In this process, Alpha 102-1500 rosin flux was applied on C4 solder bumps on the device chip and on the joining metal pads on the substrate side. The parts were assembled and aligned, and the assembly was subjected to a high temperature chip reflow profile up to 360–365° C. and cooled to room temperature before removal from the furnace. After chip join, the assembly was subjected to the flux residue cleaning process according to the sequence of steps outlined in FIG. 6. Cleaning experiments were performed according to the process flow outlined in FIG. 6. The varying cleaning parameters included: the time; temperature; number of process steps with and without the addition of surfactant; concentration and the type of surfactant in TPBE (in step 1 of FIG. 6); number of chips attached and without chips attached.

Cleaning effectiveness in each case was monitored by: examining the residual fluorescence at the periphery of the attached chip and also under-the-chip after chip detachment; solvent extraction of the assembly (with chips attached) after cleaning and measuring ultra violet absorption characteristics of the extract; under-the-chip encapsulation with epoxy underfill and recording sonoscans for CSAM (computerized acoustic microscopy) to determine the presence or absence of voids in the encapsulant. The cleaning process parameters and the characterization of cleaning effectiveness under varying conditions are shown in the representative examples 1 through 9 in table 2.

TABLE 2

Representative Example[a]
Flux Residue Removal Process and Results

| Example #/ chips attached | TPBE/ surf ct. | TPBE | TPBE | DPM | Water rinse | Results |
|---|---|---|---|---|---|---|
| 1<br>2 chips | TPBE/10 2–1500 flux 90/10, 75° 10 min soak | 10 min, 75°, agitation | 10 min, 75°, stirred | 5 min, 65°, agitation | a) 5 min, 60°.<br>b) RT spray | no fluorescence, no voids |
| 2<br>2 chips | TPBE/flux 90/10, 75° 7 min soak | 15 min, 75°, agitation | NA | 5 min, 65°, agitation | RT spray rinse & dry | no fluorescence, no voids |
| 3<br>1 chip | TPBE/flux 90/10, 70° 7 min soak | 10 min, 70°, agitation | NA | 7 min, 65°, agitation | RT spray rinse & dry | no fluorescence, no voids |
| 4<br>2 chips | TPBE/flux 80/20, 72° 10 min soak | 10 min, 70°, agitation | NA | 5 min, 60°, agitation | RT spray rinse & dry | no fluorescence, no voids |
| 5<br>none | TPBE/no flux, 75° 15 min soak/ agitation | NA | NA | 7 min, 65°, agitation | a) 5 min, 60°<br>b) RT spray rinse & dry | speckled fluorescence remains |
| 6<br>1 chip | TPBE/no flux, 75° 10 min soak | 10 min, 75°, agitation | NA | 5 min, 65°, agitation | RT spray rinse & dry | some residue reamins at the chip edge |
| 7<br>1 chip | TPBE/ BaOH 90/10, 75° 12 min soak | 10 min, 70°, agitation | NA | 5 min, 65°, agitation | RT spray rinse & dry | some fluorescence remains |
| 8<br>1 chip | TPBE/ LF-1, 70°, 10 min soak | 7 min, 75°, agitation | NA | 7 min, 60°, agitation | RT spray rinse & dry | speckled fluorescence remains at the chip edge |
| 9<br>1 chip | THF solvent, 50°, 10 min soak | THF solvent, 50°, 7 min agitation | THF solvent, 7 min rt rinse | NA | NA | trace fluorescence remains at the chip edge |

[a]TPBE: tri(propylene glycol) butyl ether; DPM: di(propylene glycol) methyl ether; Flux: Rosin flux alpha 102–1500 solution in benyl alcohol; Glucopon LF1: low foam surfactant; THF: tetrahydrofuran.
"no voids" means that the Sonoscan images show no defects or adhesion problem in the under-the-chip encapsulant that is applied after flux residue removal.

Referring to Table 2, in example 1 (row 1), an assembly with two chips attached using a high temperature solder reflow and having flux residue, was cleaned using 90/10 (weight %) TPBE/Alpha 120-1500 rosin flux in the first step. The second step was cleaning with TPBE only. This was followed by an additional cleaning with TPBE. This was followed by immersion cleaning in a hydrophilic solvent and water rinse in two steps, first using hot water and then room temperature water spray rinse. UV analysis of the cleaned assembly showed no fluorescence at the periphery of the chips indicating the absence of flux residue in that region. The absence of flux residue under the chips was confirmed by the subsequent dispense of an epoxy encapsulant followed by thermal curing, and recording sonoscans. The sonoscan images showed no voids. Voids are defects which would be present due to the presence of rosin flux residue.

In example 2 (row 2), an assembly was prepared and cleaned as in example 1, except for changing the cleaning times as shown in the first and second step, eliminating the additional TPBE only cleaning step, and using room temperature water directly after immersion cleaning in the hydrophilic solvent. Post cleaning analysis showed no evidence of residue at the attached chip periphery or under the chips.

In example 3 (row 3), an assembly carrying only one chip was similarly fabricated and cleaned as in example 2, which again showed complete removal of residue.

In example 4 (row 4), an assembly with attached chips was cleaned using an 80/20 (weight %) solution of TPBE/Alpha 120-1500 rosin flux with all other cleaning steps being the same as in examples 2 and 3. Post cleaning analysis showed no evidence of residue at the attached chip periphery or under the chips.

In example 5 (row 5), flux residue was formed on a ceramic substrate having Mo/Ni/Au pads by applying Alpha 120-1500 rosin flux and subjecting the substrate to a simulated high temperature solder reflow. The TPBE only cleaning step was eliminated. Post clean UV analysis showed scattered fluorescence regions. This indicates the intermediate step of TPBE only immersion cleaning is beneficial in providing complete residue removal.

In example 6 (row 6), the same cleaning sequence was followed as in examples 2 to 4 except that no flux additive was incorporated in the first TPBE cleaning step. Post clean UV analysis showed incomplete residue removal as indicated by fluorescence at the periphery of the attached chip. This indicates that the addition of the flux component in the hydrophobic solvent in the first cleaning step is beneficial in providing complete residue removal.

In example 7 (row 7), Benzyl alcohol was substituted for the flux additive in the first cleaning step with the remaining cleaning process the same as examples 2–4 and 6. Post cleaning UV analysis showed some fluorescence regions at the chip periphery indicating flux is a more effective additive than benzyl alcohol.

In example 8 (row 8), a low foam surfactant LF-1 (Cognis Corporation) was substituted for the flux additive in the first cleaning step while keeping all other cleaning parameters the same as in example 7. Post clean UV analysis showed speckled fluorescence at the chip periphery indicating the presence of trace flux residue.

In example 9 (row 9), for a comparison of the cleaning effectiveness in THF, an assembly with one chip was cleaned in THF only. Post clean UV analysis showed only a trace of residual fluorescence. However, THF is not a preferred solvent because it is highly flammable with a flash point of 1° F. (−17° C.), and boiling point of 65–67° C.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

What is claimed is:

1. A method for removing rosin flux residue formed on electronic assembly surfaces, interfaces and under device surfaces during high temperature solder interconnections which comprise the steps of:

(a) providing a first cleaning composition which comprises a first water insoluble hydrophobic solvent with a surface active agent, wherein said hydrophobic solvent are propylene glycol alkylethers represented by the formula RO—$(C_3H_6O)_N$—$C_3H_6OH$ wherein R is selected from the group consisting of propyl, butyl, pentyl and isobutyl and where N=0 to 4;

(b) immersing the assembly in said first cleaning composition and soaking the assembly in said first cleaning composition for 10 to 20 minutes at 50 to 90° C. with intermittent agitation;

(c) removing the assembly from said first cleaning composition;

(d) immersing the assembly in a second cleaning solvent, without adding surfactant, which comprises water insoluble hydrophobic propylene glycol alkylethers represented by the formula RO—$(C_3H_6O)_N$—$C_3H_6OH$ wherein R is selected from the group consisting of propyl, butyl, pentyl and isobutyl and where N=0 to 4 and soaking the assembly in said second cleaning solvent for 5 to 20 minutes at 50 to 90° C. with agitation;

(e) removing the assembly from said second cleaning solvent;

(f) applying a third cleaning composition which comprises a hydrophilic water soluble propylene glycol methyl ether solvent at 50 to 75° C. to the assembly for 5 to 10 minutes;

(g) applying a water use at approximately room temperature to 65° C. to the assembly for approximately 5 to 10 minutes; and (h) drying the assembly and thereby complete the removal of the flux residue from the assembly surfaces, interfaces and from under the device surface.

2. The method of claim 1 wherein said surface active agent is an ionic surfactant.

3. The method of claim 1 wherein said surface active agent is a combination of ionic and non ionic surfactants.

4. The method of claim 3 wherein said ionic surfactant comprise approximately 60 to 70 weight % rosin flux and approximately 30 to 40 weight % benzyl alcohol.

5. The method of claim 1 wherein the agitation of step (d) is an immersion spray.

6. The method of claim 1 wherein said hydrophilic water soluble propylene glycol methyl ether solvent is applied by immersion with pressure spray.

7. The method of claim 2 wherein said ionic surfactant is about 5 to 25 weight % of said first water insoluble hydrophobic solvent.

8. The method of claim 3 wherein said combination of ionic and non-ionic surfactants is about 5 to 25 weight % of said first water insoluble hydrophobic solvent.

9. The method of claim 3 wherein said non-ionic surfactant is selected from the group consisting of rosin acid ester derivatives, abietyl alcohol, dihydroabietyl alcohol and mixtures thereof, and wherein said ionic surfactant is selected from the group consisting of abietic acid, dihydrabietic acid, tetrahydroabietic acid, dehydroabietic acid, and mixtures thereof.

10. The method of claim 3 wherein said non-ionic surfactant is selected from the group consisting of low foam alkyl polyglycosides, ethoxylated propoxylated aliphatic alcohols, and mixtures thereof.

11. The method of claim 1 wherein said hydrophilic water soluble propylene glycol methyl ether solvent is represented by the formula CH3O -$(C_3H_6O)_N$—$C_3H_6OH$ where N=0 to 4.

12. The method of claim 2 wherein said ionic surfactant is selected from the group consisting of abietic acid, dihydrabletic acid, tetrahydroabietic acid, dehydroabietic acid, and mixtures thereof.

13. The method of claim 1 wherein the drying of step (h) comprises blowing gas on the assembly and then heating the assembly to 80 to 120° C.

14. The method of claim 13 wherein said gas is $N_2$.

15. The method of claim 13 wherein said gas is air.

16. The method of claim 1 where N=1 to 3.

17. The method of claim 11 where N=1 to 3.

18. The method of claim 13 wherein said step of heating the assembly to 80 to 120° C. is performed under vacuum.

19. The method of claim 1 wherein said electronic assembly comprises a chip circuit joined to a ceramic substrate using Pb/Sn solder with peak reflow temperature of approximately 345–365° C.

20. The method of claim 1 wherein said electronic assembly comprises a chip circuit joined to a ceramic substrate using Pb free solder selected from the group consisting of Sn/Ag/Cu, Sn/Ag, Sn/Bi and Au/Sn in the presence of high temperature rosin flux.

* * * * *